United States Patent
Montgomery (10) Patent No.: US 6,564,995 B1
(45) Date of Patent: May 20, 2003

(54) SMART CARD APPLICATION-SELECTION (75) Inventor: Michael A. Montgomery, Austin, TX (US)

(73) Assignee: Schlumberger Malco, Inc., Owings Mills, MD (US)

(*) Notice: Subject to any disclaimer, the term of this patent is extended or adjusted under 35 U.S.C. 154(b) by 0 days.

(21) Appl. No.: 09/156,371

(22) Filed: Sep. 17, 1998

Related U.S. Application Data (60) Provisional application No. 60/059,382, filed on Sep. 19, 1997.

(51) Int. Cl.[7] .............................................. G06F 17/60

(52) U.S. Cl. ....................................... 235/379; 235/375

(58) Field of Search ................................ 235/379, 380, 235/449, 375

(56) References Cited

U.S. PATENT DOCUMENTS

| 3,977,785 A | 8/1976 | Harris |
| 4,168,396 A | 9/1979 | Best |
| 4,278,837 A | 7/1981 | Best |

(List continued on next page.)

FOREIGN PATENT DOCUMENTS

| EP | 0 665 486 A2 | 8/1995 |
| EP | 0 696 121 A1 | 2/1996 |
| EP | 0 717 338 A1 | 6/1996 |
| FR | 2 667 171 | 3/1992 |
| JP | 95207400 | 7/1995 |
| WO | WO 96/25724 | 8/1996 |
| WO | PCT US/97/18999 | 10/1997 |

OTHER PUBLICATIONS

Jacquelyn Gavron and Joseph Moran, "How to Use Microsoft Windows NT 4 Workstation", 1996 Ziff Davis Press, pp. 30–31.*
"NetChex", Netl, Inc., Home Page (Internet Feb. 1997).
"Mondex International", Mondex International Limited, Home Page (Internet Feb. 1997).
"Electronic Payment Schemes", Dr. Phillip M. Hallam–Baker, World Wide Web Consortium (Internet Feb. 1997).
"DigiCash", DigiCash by, Home Page (Internet Feb. 1997).
"CyberCash", CyberCash, Inc., Home Page (Internet Feb. 1997)
Phillip M. Hallam–Baker, "Micro Payment Transfer Protocol (MPTP) Version 0.1", W3C Working Draft, Nov. 22, 1995.
"Secure Electronic Transaction (SET) Specification", Book 2: Technical Specifications, Draft for Public Comment, Feb. 23, 1996, pp. 1–10; 129–186.
Blaze, M., "High–Bandwidth Encryption with Low–Bandwidth Smartcards", in *Fast Software Encryption: Third Int'l Workshop* (ed. D. Gollman), Feb. 1996.

(List continued on next page.)

*Primary Examiner*—Mark Tremblay
(74) *Attorney, Agent, or Firm*—Pehr B. Jansson; William Batzer; John J. Ryberg (57) ABSTRACT

A multi-application smart card has a persistent storage unit. The persistent storage unit stores data and/or information that indicates which application is to be run the next time the smart card is inserted into a terminal. The persistent storage unit may indicate the same application, a different user-selected application, or an application-selection application is to be run next. Alternatively, the persistent storage unit may indicate the next application on a predefined list as the application to be run next. An application-selection terminal allows a user to manually select the user-selected application. The terminal may initiate communication with the smart card by sending a special, predefined signal to the smart card.

37 Claims, 9 Drawing Sheets

U.S. PATENT DOCUMENTS

| | | |
|---|---|---|
| 4,465,901 A | 8/1984 | Best |
| 4,562,306 A | 12/1985 | Chou et al. |
| 4,598,810 A | 7/1986 | Shore et al. |
| 4,634,807 A | 1/1987 | Chorley et al. |
| 4,688,169 A | 8/1987 | Joshi |
| 4,725,079 A | 2/1988 | Koza et al. |
| 4,748,561 A | 5/1988 | Brown |
| 4,890,319 A | 12/1989 | Seth-Smith et al. |
| 4,890,321 A | 12/1989 | Seth-Smith et al. |
| 4,926,480 A | 5/1990 | Chaum |
| 5,068,894 A | 11/1991 | Hoppe |
| 5,123,045 A | 6/1992 | Ostrovsky et al. |
| 5,247,575 A | 9/1993 | Sprague et al. |
| 5,375,240 A | 12/1994 | Grundy |
| 5,412,191 A | 5/1995 | Baitz et al. |
| 5,420,405 A | 5/1995 | Chasek |
| 5,440,631 A | 8/1995 | Akiyama et al. |
| 5,444,779 A | 8/1995 | Daniele |
| 5,461,217 A | 10/1995 | Claus |
| 5,509,070 A | 4/1996 | Schull |
| 5,530,520 A | 6/1996 | Clearwater |
| 5,532,920 A | 7/1996 | Hartrick et al. |
| 5,581,708 A * | 12/1996 | Iijima .......................... 710/11 |
| 5,678,029 A * | 10/1997 | Iijima .......................... 710/65 |
| 5,705,798 A * | 1/1998 | Tarbox ....................... 235/379 |

OTHER PUBLICATIONS

"The Copyright Website" Home Page (Internet 7/97).

Intellectual Property: The Property of the Mind, The Economist, Jul. 27, 1996, pp. 57–59.

Lehman, B., "Intellectual Property & the Nat'l. Information Infrastructure", U.S. Patent and Trademark Office, Sep. 1995, pp. 177–200.

"CCC Online", Copyright Clearance Center, Inc. (Internet 7/97).

"IBM Cryptolope Containers", IBM infoMarket, International Business Machines Corporation (Internet 8/97).

"IBM infoMarket Rights Management Overview", IBM infoMarket, International Business Machines Corporation (Internet 8/97).

"WIBU Systems Copy Protection", WIBU–Systems AG (Internet 2/97).

"Microsoft Authenticode", Microsoft Corporation (Internet 2/97).

"McAfee Network Security & Management", McAfee Associates Inc. (Internet 2/97).

"SoftLock Services Home Page", SoftLock Services, Inc. (Internet 2/97).

Bruno Struif, "The Use of Chipcards for Electronic Signatures and Encryption", IEEE Proceedings of the VLSI and Computer Peripherals Conference, May 1989, pp. 4–155 –4–158.

Stephen T. Kent, "Protecting Externally Supplied Software in Small Computers", Massachusetts Institute of Technology, Sep. 1980, pp. 2–8, 12–39, 67–76 and 212–236.

R. Mori and M. Kawahara, "Superdistribution: The Concept and the Architecture", The Transactions of the IEICE, vol. E73, No. 7, Jul. 1990, pp. 1133–1146.

John Kelsey and Bruce Schneier, "Authenticating Outputs of Computer Software Using a Cryptographic Co–Processor", Proceedings of CARDIS '96, Amsterdam (1996).

Federal Information Processing Standards Publication 190, "Annoucing The Guideline For The Use Of Advanced Authentication Technology Alternatives", Sep. 28, 1994.

Oded Goldreich and Rafail Ostrovsky, "Software Protection and Simulation on Oblivious RAM's", Journal of the ACM, vol. 43, No. 3, May 1996, pp. 431–473.

Trent Jaeger and Aviel D. Rubin, "Protocols for Authenticated Download to Mobile Information Appliances", The University of Michigan, Dept. of Electrical Engineering & Computer Science, Dec. 1995.

\* cited by examiner

SMART CARD APPLICATION-SELECTION

This application claims the benefit of the filing of U.S. Provisional Patent application No. 60/059,382, filed Sep. 19, 1997.

BACKGROUND OF THE INVENTION

The invention relates to smart cards and, in particular, to smart card application selection in a multi-application smart card.

Smart cards are used for a wide variety of applications including electronic game cards, bank cards, and identification badges. The smart cards are typically encased in a tamper resistant, plastic or metal housing about the size of a credit card and contain one or more embedded integrated circuit devices. Terminals, such as electronic casinos, automatic teller machines, and ID verification systems, are known which employ one or more smart card interfaces to connect the smart card to the terminal.

Conventional terminals have built-in communications protocols that are used to support the smart card applications. These protocols typically require the smart card, upon receiving a reset from the terminal, to immediately identify itself by providing an Answer To Reset (ATR). Each smart card application may have a different ATR and/or require a different protocol. Therefore, if the terminal does not receive a recognizable ATR, i.e., the terminal does not support the application, it may immediately reject the smart card.

Figure 1:
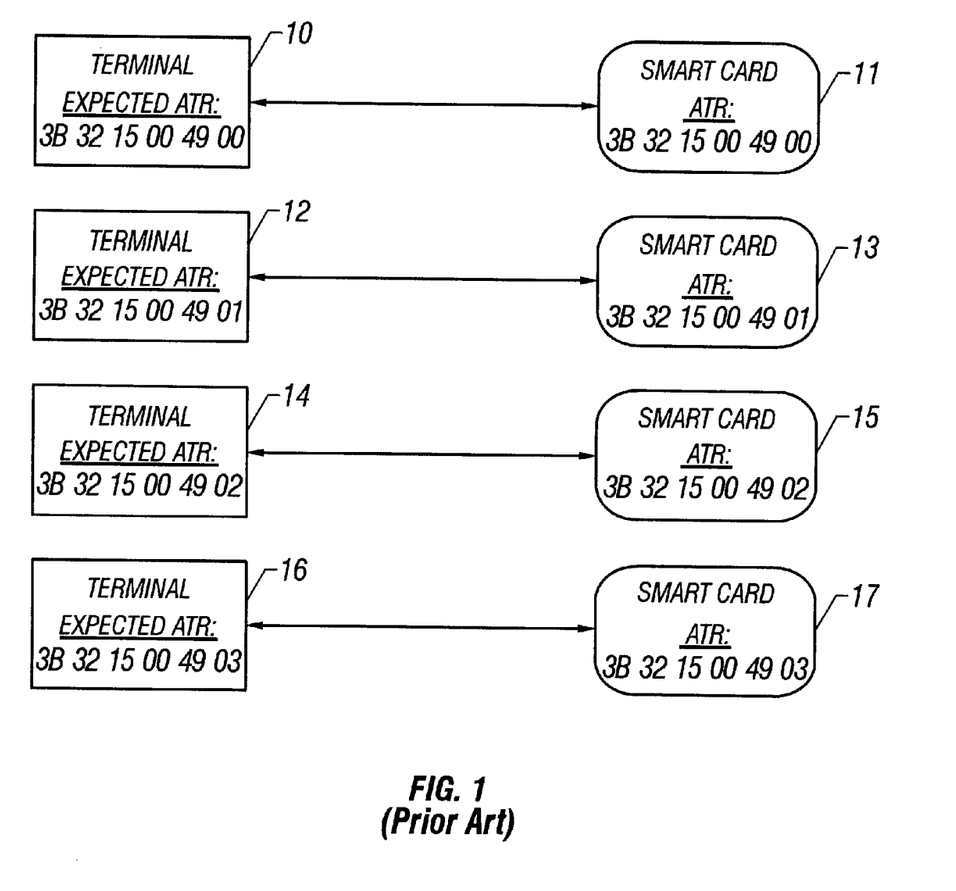
FIG. 1 illustrates single-application smart cards and their respective terminals.

For single-application smart cards, the card simply provides its only ATR, and the terminal either accepts or rejects the card. Referring to FIG. 1, conventional terminals 10, 12, 14, 16 are compatible with and will only recognize certain expected ATRs from smart cards 11, 13, 15, 17, respectively. However, with the advent of multi-application smart cards, even though the correct card may be inserted, the wrong ATR may be provided to the terminal because each application on the card may have a different ATR and/or communications protocol. The smart card has no opportunity to discover the nature of the terminal before providing the ATR and, therefore, does not know which ATR is required.

One solution is to have a selection mechanism by which the terminal sends the multi-application smart card a "Select" command which selects the particular application to be run. Once selected, information and/or data going to and from the smart card are routed to the selected application until another Select command is received. Cards using this mechanism must have a specific ATR to be recognized by the terminals which support the mechanism.

The selection mechanism works well but has two primary drawbacks. First, most of the presently existing terminals do not support this selection mechanism and will not recognize the associated ATR. Therefore, cards implementing this mechanism will only be compatible with newer terminals that are designed to support application selection and can not be used in the vast base of existing terminals. Second, terminal and terminal device designers and/or software programmers have to expend time, effort and resource to incorporate this selection mechanism into their products. It would be much easier for them to simply use the existing terminal and terminal device specifications.

SUMMARY OF THE INVENTION

The present invention is directed to a method and/or mechanism for selecting the next application to run on a multi-application smart card.

In general, in one aspect, the invention relates to a multi-application smart card that comprises a persistent storage unit that indicates a present application to be run. The smart card runs the application indicated by the persistent storage unit and modifies the persistent storage unit to indicate a next application to be run. In some embodiments, the smart card may run an application-selection application between each conventional application. The application-selection application allows a user to select which application to run next. The smart card may also select the next application based on a predefined list of applications. The next application may be the same application as the present application. The smart card may use special signaling to activate an application-selection application.

In general, in another aspect, the invention relates to a multi-application smart card comprising means for indicating a present application to be run, means for running the indicated application, and means for modifying the means for indicating to indicate a next application to be run. In one embodiment, the means for modifying modifies the means for indicating to indicate an application-selection application as the next application to be run. In another embodiment, the means for modifying modifies the means for indicating to indicate a next application on a predefined list as the next application to be run. The means for modifying may also modify the means for indicating to indicate the present application as the next application to be run, or a user-selected application as the next application to be run. Upon receiving a predefined signal from a smart card terminal, the means for running may run an application-selection application which allows a user to select which application to run next.

In general, in another aspect, the invention relates to a smart card system comprising a multi-application smart card having a persistent storage unit which designates a next application to be run on the smart card, and an application-selection terminal that allows a user to select which application to be run next on the smart card. In some embodiments, the smart card modifies the persistent storage unit to designate an application-selection application as the application to be run next. In other embodiments, the terminal modifies the persistent storage unit to designate a user-selected application as the application to be run next.

Advantages of the invention include at least the following: flexibility and ease in selecting one of several applications on a multi-application smart card, and maintaining compatibility with the existing installed base of conventional smart card terminals. This backwards compatibility facilitates use of multi-application smart cards in traditional single application terminals while permitting innovative new applications to be deployed on the same card. Other advantages will become apparent from the following description and from the claims.

DETAILED DESCRIPTION OF THE PREFERRED EMBODIMENTS

Throughout the description and the figures, elements that are the same will be accorded the same reference numbers.

Figure 2:
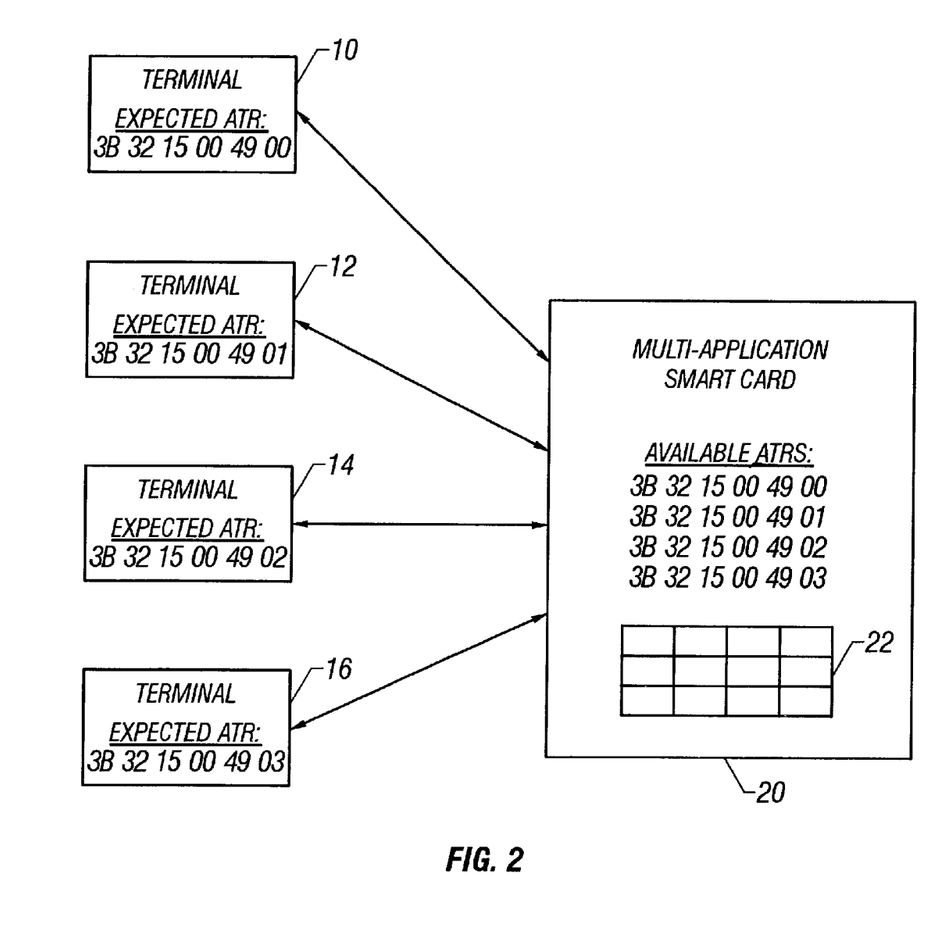
FIG. 2 illustrates a multi-application smart card.

Referring to FIG. 2, a multi-application smart card 20 contains at least four conventional applications supported by conventional terminals 10, 12, 14, 16, as indicated by the available ATRs. A persistent storage unit 22 on the smart card 20 stores the name, location, or other information indicating which one of the four applications is to be run when the smart card 20 is inserted into the terminals 10, 12, 14, 16. The persistent storage unit 22 may be an EEPROM or FLASH memory, or any other memory which retains its data when the smart card is not powered up. From the above description, it will be appreciated that a mechanism or scheme must be provided to alter or change the value stored in the persistent storage unit 22 to the value of the desired application in order to prevent the wrong application from being run when the smart card 20 is inserted into a terminal.

Figure 3A:
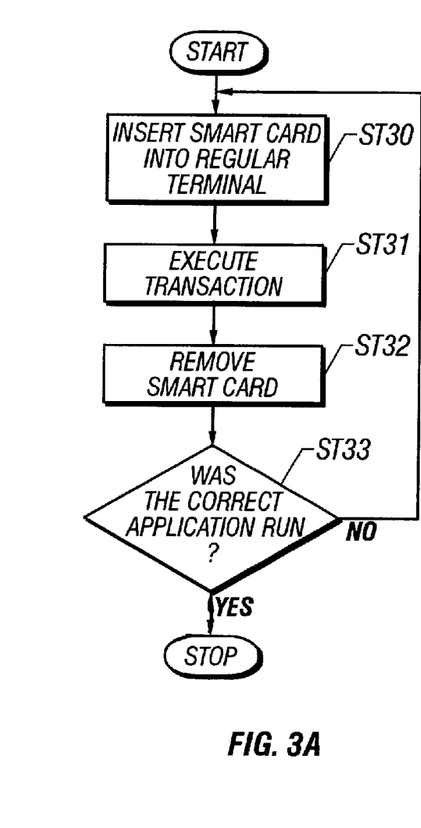
FIGS. 3A and 3B are flow charts showing the operation of a smart card wherein the next application to be run is determined according to a predefined list.

Referring to FIG. 3A, operation of the multi-application smart card begins with a user inserting the smart card 20 into a conventional or regular terminal (ST30). A transaction is executed between the smart card 20 and the terminal (ST31), and the user removes the smart card 20 from the terminal at the end of the transaction (ST32). Because of the multiple applications on the smart card 20, the user has to determine if the correct application was run (ST33). If it happens that the correct application was run, then the user simply stops or goes about his other business. If the wrong application was run, then the user may reinsert the smart card 20 back into the terminal (ST30).

The key to this embodiment is each time the user executes a transaction (ST31), a different application in a list of applications in the smart card 20 is run. Thus, through a sort of round-robin process which will be described in more detail below, the correct application may eventually be run by repeated insertion of the smart card 20.

Figure 3B:
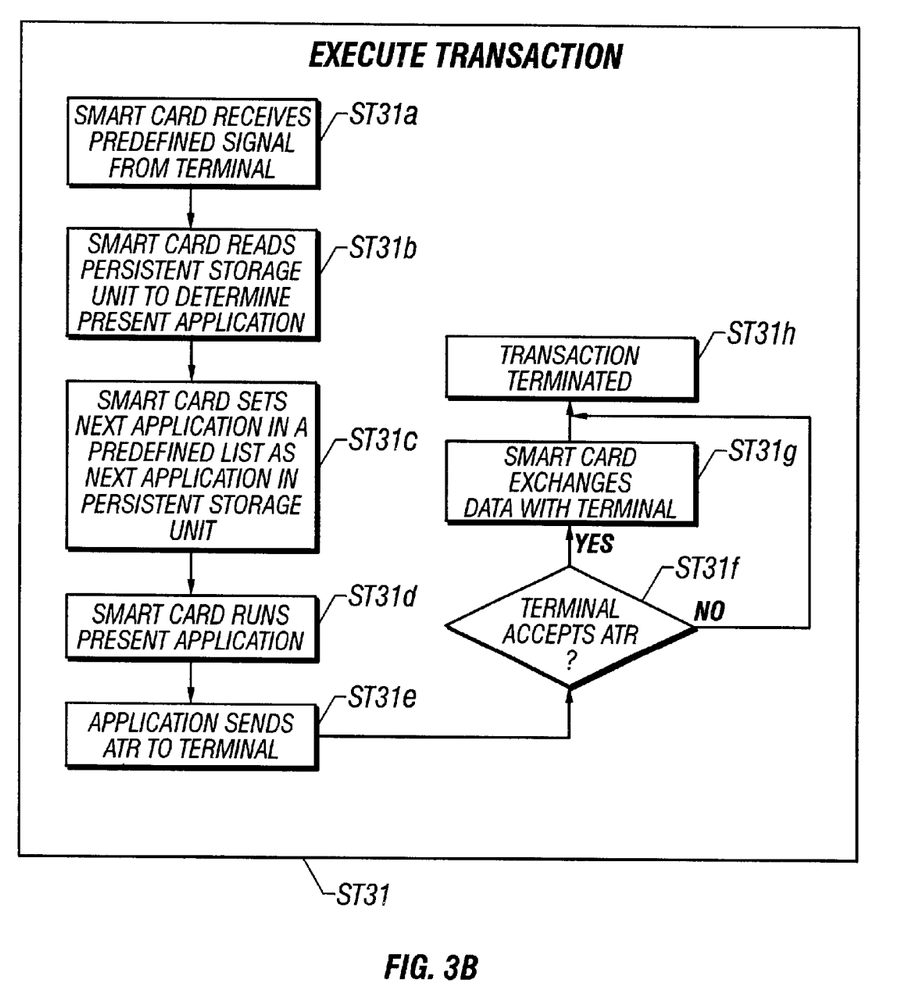

Referring to FIG. 3B, user execution of a transaction (ST31) begins with the smart card 20 receiving a predefined signal, such as a Reset signal, from the terminal (ST31a). Upon receiving the predefined signal, the smart card 20 reads the value stored in the persistent storage unit 22 to determine the present application to be run (ST31b). The smart card 20 then modifies the persistent storage unit 22 to store the value of the application that is next in line on a predefined list of applications (ST31c). Note that in most embodiments, the predefined list of applications will generally be created and/or modified upon installation or deletion of applications on the smart card, so that the list will track available applications. The application corresponding to the value stored in the persistent storage unit 22 will then be the application that is run the next time the smart card 20 is inserted into the terminal. The smart card 20 then runs the present application (ST31d) which sends its ATR to the terminal (ST31e). The terminal then determines if the ATR is one that is recognizable or acceptable to the terminal (ST31f). If it is, then the smart card 20 and the terminal exchange data (ST31g) or otherwise carry out a transaction, and afterwards the transaction is terminated (ST31h). If it is not, then the transaction is terminated right away (ST31h).

This embodiment has the advantage of being able to run any application on the smart card 20 without requiring a special terminal to select the application. However, the process of repeatedly inserting and removing the smart card 20 could be cumbersome if there is a large number of applications on the card. Furthermore, it is possible that some terminals may react adversely to the repeated insertion of a card that is supplying an unrecognized ATR.

Figure 4:
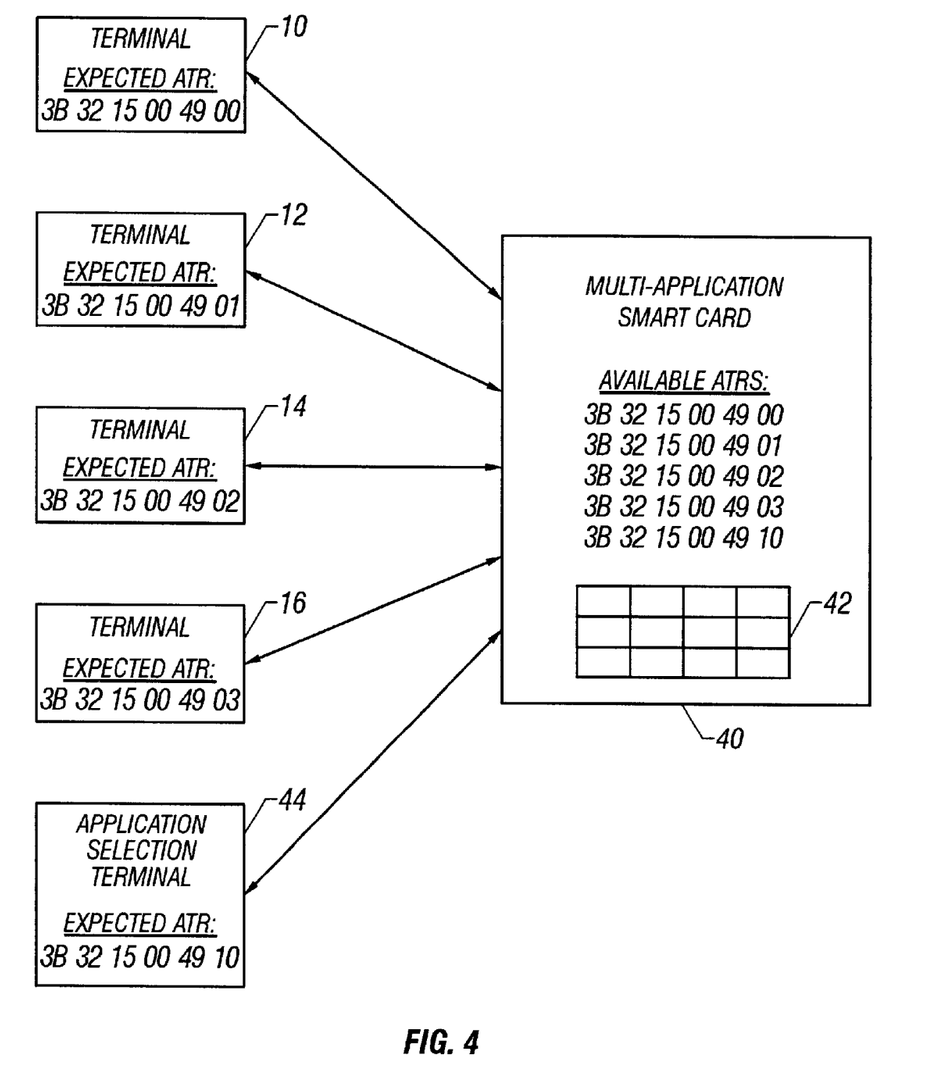
FIG. 4 illustrates a multi-application smart card having an application-selection application and an application-selection terminal.

In another embodiment, referring to FIG. 4, a smart card 40 has a persistent storage unit 42 and contains a fifth available ATR for a special "application-selection" application which is only supported by a special, application-selection terminal 44. In some embodiments, the application-selection terminal 44 is a which is a small, portable terminal that can easily be carried around. Clearly, however, any other terminal can be used which supports the application-selection application, including other portable terminals, portable or desktop computers equipped with smart card readers, or any other terminal that supports this application.

When inserted into the terminal 44, the smart card 40 provides the terminal 44 with the ATR for the application-selection application. After the terminal 44 accepts-or otherwise acknowledges the ATR, the smart card 40 runs the application-selection application which allows a user to manually select, via the terminal 44, the application that is to be run next. The terminal 44 subsequently modifies the value stored in the persistent storage unit 42 to indicate the selected application as the application to be run on next insertion.

Figure 5A:
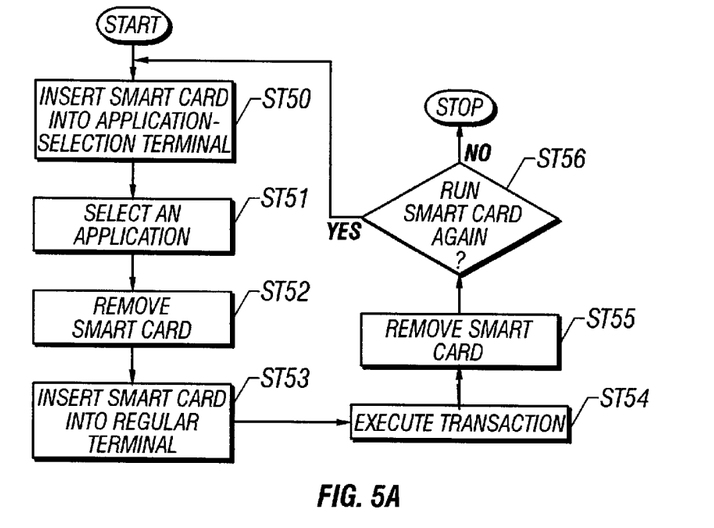
FIGS. 5A–5C are flow charts showing the operation of a smart card wherein an application-selection application is run between each other application.

Referring to FIG. 5A, in one embodiment, operation of the smart card 40 begins by inserting the card into the application-selection terminal 44 (ST50). The user then selects the desired application that is to be run (ST51) and removes the smart card 40 (ST52). Next, the user inserts the smart card into the desired conventional or regular terminal (ST53). The user executes the desired transaction (ST54) and removes the smart card 40 afterwards (ST55).

The key to this embodiment is that the application-selection application is the default application to be run. In order to run any other application, the user must first insert the smart card 40 into the application-selection terminal 44. This allows the user to manually select the desired application. The user may then insert the smart card 40 into the desired regular terminal confident that the correct application will be run.

Figure 5B:
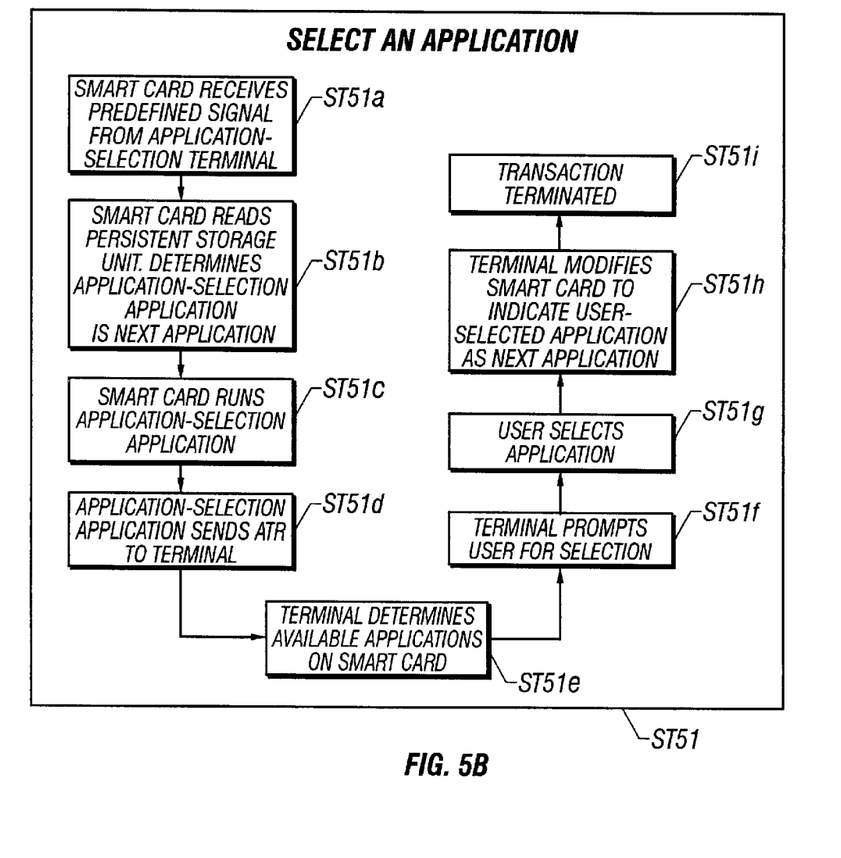

Referring to FIG. 5B, user selection of an application (ST51) begins with the smart card 40 receiving a predefined signal from the terminal 44 (ST51a). The smart card 40 then reads the persistent storage unit 42 and finds that the application-selection application is to be run next (ST51b). The smart card 40 then runs the application-selection application (ST51c) which sends its ATR to the terminal 44 (ST51d). The terminal 44 polls, surveys, or otherwise determines the applications that are available on the smart card 40 (ST51e). The terminal 44 then prompts the user to make a selection (ST51f), and the user makes the selection (ST51g). In a preferred embodiment, the terminal 44 then modifies the persistent storage unit 42 to indicate the user-selected application as the application to be run (ST51h). In some embodiments, the terminal 44 may pass the value of the user-selected application to the smart card 40 instead, and the smart card modifies the persistent storage unit 42 accordingly. Afterwards, the transaction is terminated (ST51i).

Figure 5C:
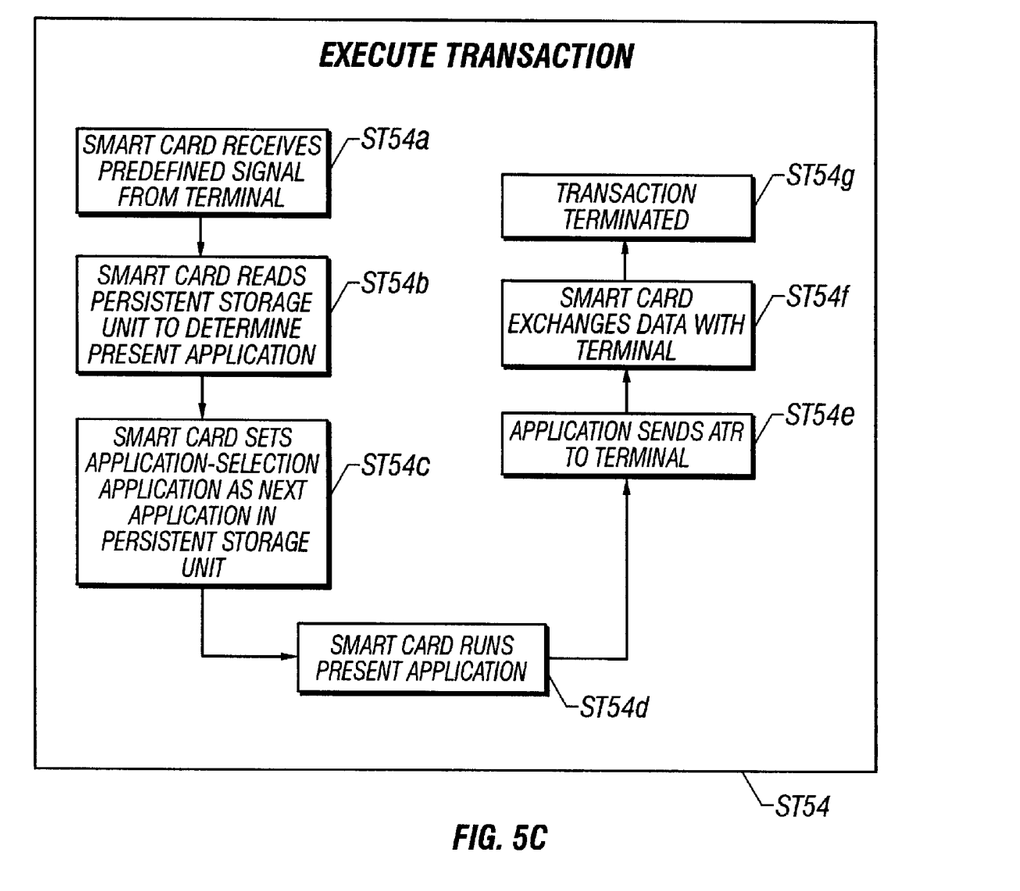

In this embodiment, referring to FIG. 5C, execution of a transaction (ST54) is in a manner identical to that of the smart card 20 of FIGS. 3A and 3B except the value stored in the persistent storage unit 42 is not determined according to a predefined list. (See FIG. 3B, ST31c). Instead, in this embodiment, the smart card 40 always modifies the persistent storage 42 to indicate the application-selection application as the application to be run next (ST54c).

Note that in this embodiment, in order to use the card in a regular terminal again, even in the very same regular terminal from which the card was just removed, it is necessary to reinsert the smart card 40 back into the terminal 44 and select the desired application again because the application-selection application will have been designated as the next application to run. Therefore, while the embodiment has the advantage of making it possible for a user to select the desired application without having to upgrade or replace the existing regular terminals, it does require that a terminal 44 be available in order for the user to make the selection.

Figure 6A:
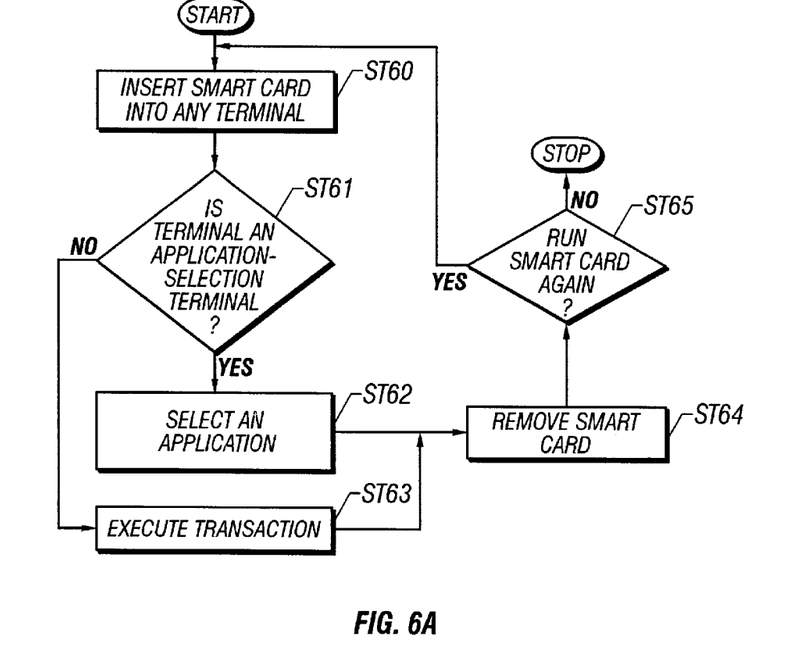
FIGS. 6A–6D are flow charts showing the operation of a smart card wherein an application-selection is run only upon detection of special signaling.

In another embodiment, as shown in FIG. 6A, the user may insert the smart card 40 into either an application-selection terminal 44 or a regular terminal (ST60) at any time. Once inserted, the smart card 40 relies on special signaling (described below) not normally employed in any conventional terminal to determine if the terminal is an application-selection terminal 44 (ST61). If yes, then the user may select an application to be run (ST62). If no, then the user may execute a regular transaction (ST63). Afterwards, the user removes the smart card 40. When the user is ready to use the smart card again, he may simply insert the smart card again into either types of terminal, and the smart card will run the appropriate application.

Figure 6B:
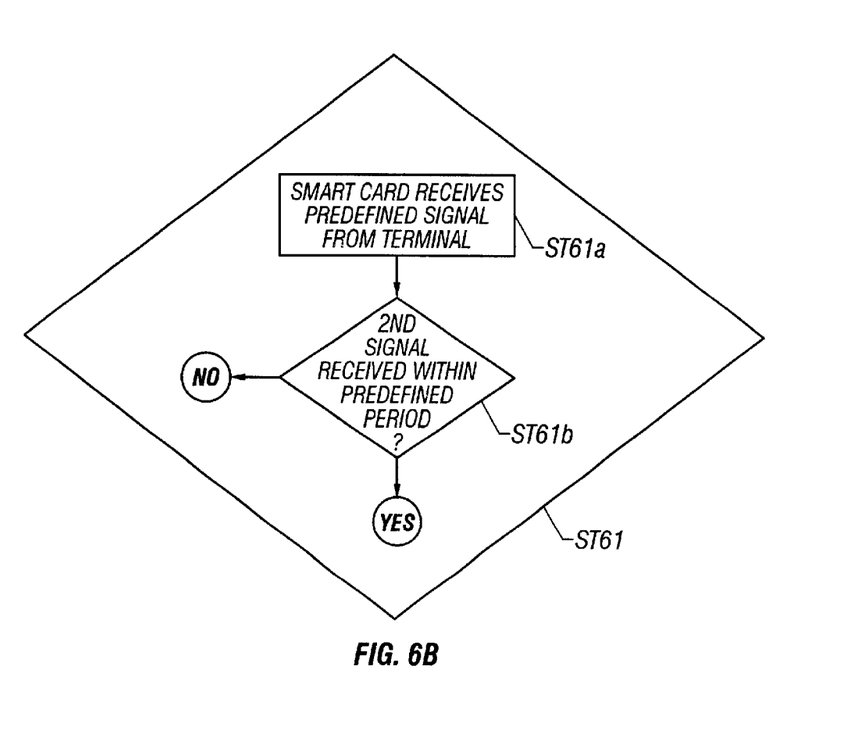

Referring to FIG. 6B, the smart card 40 determines whether the terminal is an application-selection terminal (ST61) by, for example, receiving a predefined signal from the terminal (ST61a). The smart card then waits a predefined time period to see if a $2^{nd}$ predefined signal is received (ST61b). In a preferred embodiment, the smart card 40 uses a microcontroller and/or a counter to measure the elapsed time between two reset signals. If the second reset signal occurs, say, from 0.5 and 1.5 milliseconds after the first, then the smart card determines that the terminal is an application-selection terminal 44. If the second reset occurs in any other time window, the smart card treats the terminal as a regular terminal.

Figure 6C:
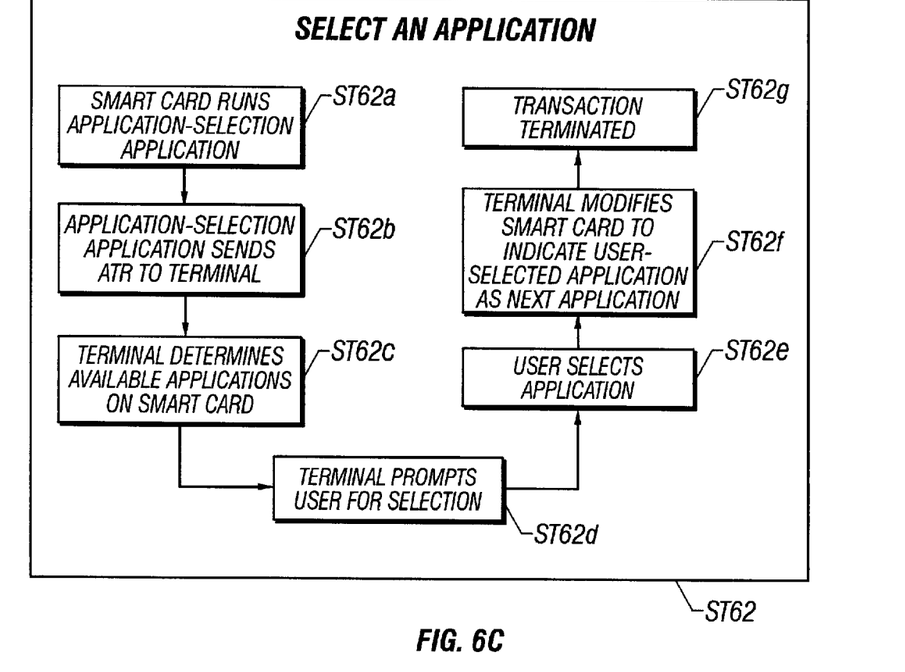

Referring to FIG. 6C, if the terminal is an application-selection terminal 44, the smart card automatically runs the application-selection application (ST62a) regardless of which application is currently designated by the persistent storage unit 42 as the application to run. The application sends its ATR to the terminal 44 (ST62b), and the selection process proceeds as shown, with the end result being that the terminal 44 modifies the persistent storage unit 42 to indicate the user-selected application as the next application (ST62f).

Figure 6D:
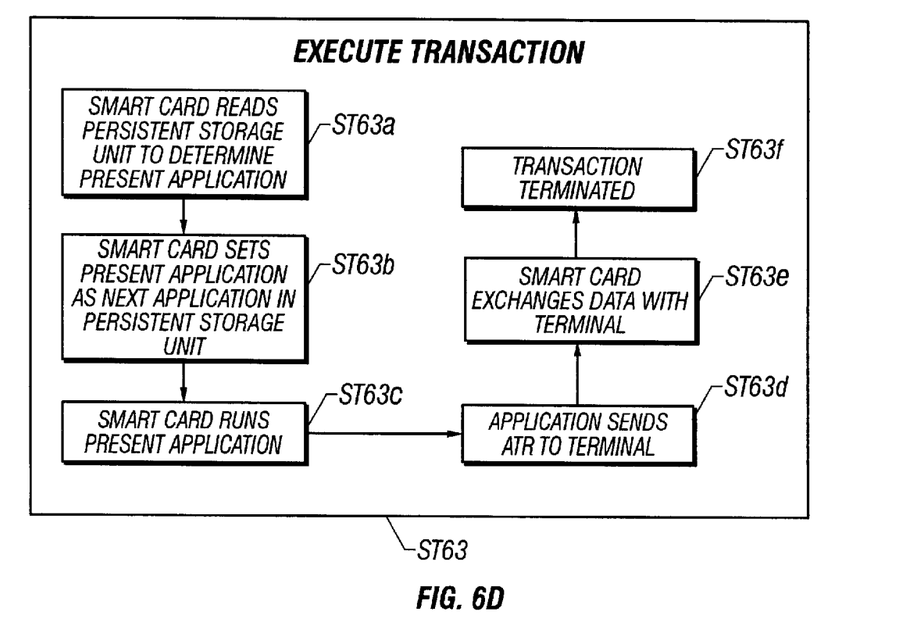

Referring to FIG. 6D, if the terminal is a regular terminal, then the smart card 40 reads the persistent storage unit 42 to determine which application is to be run (ST63a). In a preferred embodiment, the smart card 40 then sets the very same application as the next application to be run (ST63b). This can be done by modifying the contents of the persistent storage unit 42 to store the appropriate value, or by simply leaving the current value in the persistent storage unit 42 unchanged. In some embodiments, the smart card 40 may set the next application to be run according to a predefined list. The smart card 40 then runs the present application (ST63c) which sends its ATR to the terminal (ST63d). The smart card 40 and terminal exchange data (ST63e) or otherwise carries out the transaction, and the transaction is terminated (ST63f).

In a typical scenario for this embodiment, the user uses the smart card over and over again in the desired terminal until he is ready to select a different application. He then inserts the smart card into a special application-selection terminal having special signaling capability. The smart card 40, which is equipped with, for example, a microcontroller (not shown) to recognize the special signaling, bypasses the application designated by the persistent storage unit and runs the application-selection application upon receipt and recognition of the special signaling.

This embodiment has the advantage of being able to repeatedly run the same designated application on the smart card without requiring insertion into an application-selection terminal. However, it does require both a specialized smart card and application-selection terminal that can support the special signaling in order to select another application.

A detailed implementation of a preferred embodiment is illustrated by a smart card Java program contained in the Appendix. The program contains a selection application and four demonstration applications. This program is intended to run in a card which follows the Java card API, such as the Schlumberger CyberFlex™ card, and the application-selection application is designed to be compatible with a small, portable terminal that can easily be carried around.

Figure 7:
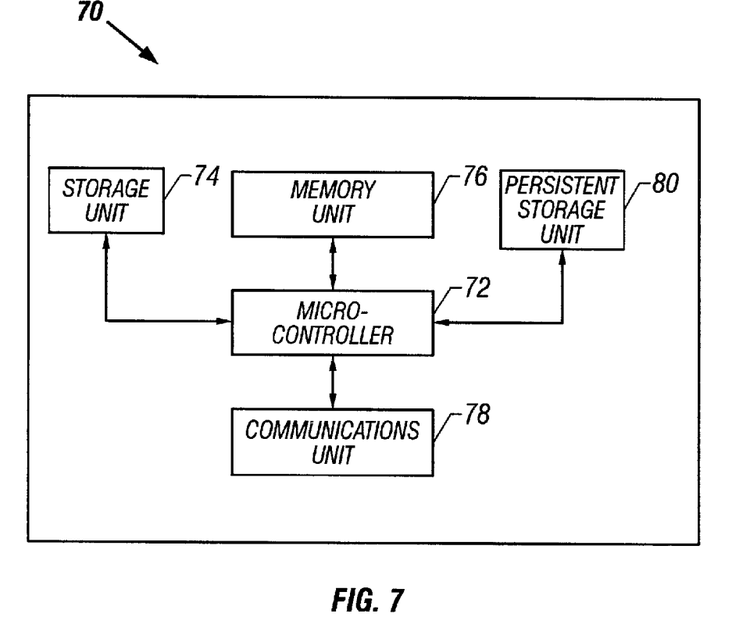
FIG. 7 illustrates a multi-application smart card of the present invention.

Referring to FIG. 7, a multi-application smart card 70 comprises a microcontroller 72 which is connected to a storage unit 74 and a memory unit 76. The microcontroller 72 executes smart card software and programs, carries out terminal instructions, and generally manages the flow of data to and from the smart card 70. In some embodiments, the microcontroller 72 may include a microprocessor, a programmable array logic (PAL), an application-specific integrated circuit (ASIC), and/or other integrated circuit devices. The storage unit 74, which may include a read-only memory (ROM), stores the programs and data, including the programs and ATRs for one or more applications, that are needed to operate the smart card 70. The memory unit 76, which may include a random-access-memory (RAM), temporarily stores the programs and data used by the microcontroller 72 during program execution. New or updated programs and data may be downloaded or programmed into the smart card 70 from time to time to upgrade the smart card 70. The smart card 70 also has a communications unit 78 connected thereto which allows the microcontroller 72 to transfer data to and from external devices. In addition, the smart card 70 has a persistent storage unit 80 that stores the name, location, or other information that indicates which application is to be run the next time the smart card 70 is inserted into a terminal. The microcontroller 72, in accordance with the embodiments described above, modifies the persistent storage unit 80 to designate the next application to be run.

Although shown as separate blocks, the microcontroller 72, storage unit 74, memory unit 76, communications unit 78, and persistent memory area 80 may be combined into a single IC device or an otherwise reduced or expanded number of separate IC devices.

Figure 8:
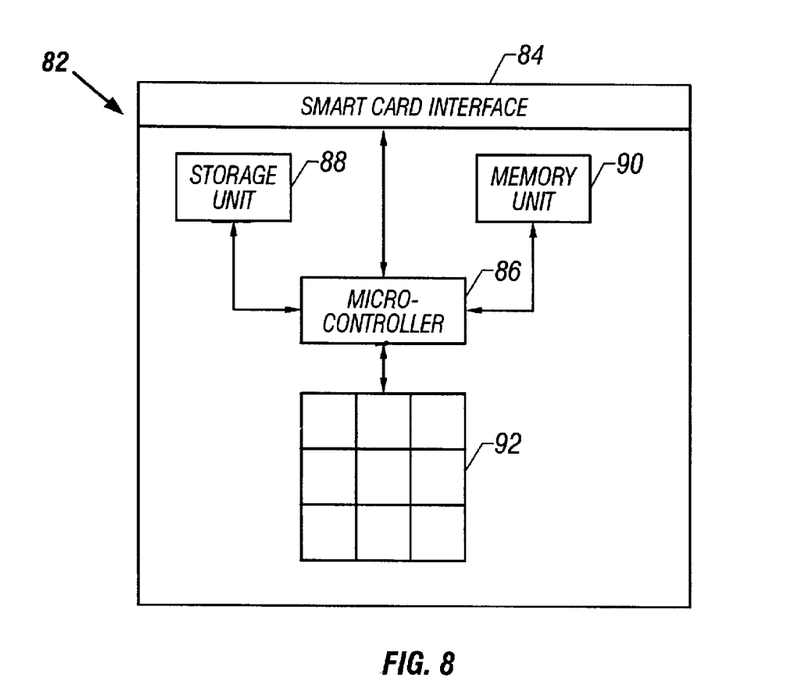
FIG. 8 illustrates an application-selection terminal of the present invention.

Referring now to FIG. 8, an application selection terminal 82 has a smart card interface 84 connected to a microcontroller 86. The interface 84 allows the smart card 80 to be connected to the terminal 82 and facilitates communication between the smart card 70 and the terminal 82. In a preferred embodiment, the interface 84 includes a smart card reader or reader-writer and/or a power supply, such as a battery (not shown), that provides power to the smart card 70. In some embodiments, the interface 84 physically engages the smart card 70. In other embodiments, however, the interface 84 may use inductive, capacitive, or optical coupling, or the interface 84 may use radio frequency signals to connect the smart card 70 to the terminal 82. The microcontroller 86, which may include one or more microprocessor, PAL, ASIC, or other IC devices, executes terminal programs and generally manages the flow of data to and from the smart card 70. A storage unit 88, which may include a hard drive, is connected to the microcontroller 86 and stores the basic programs and data needed to operate the terminal 82. A memory unit 90 temporarily stores the programs and data used by the microcontroller 86 during operation of the terminal 82. In addition, the terminal 82 has a manual selection unit 92, which may be a keypad, keyboard, or other manual selection devices that allow a user to manually enter a selection. The manual selection unit 92 allows the user to select the application that the user desires to run the next time the smart card 70 is inserted into a terminal.

Note that, as is the case with the smart card 70, the microcontroller 86, storage unit 88, and memory unit 90 of the terminal 82 may be combined into a single IC device, or an otherwise reduced or expanded number of IC devices.

Operation of the smart card 70 and terminal 82 is very similar to operation of the embodiments of FIGS. 5A–5C and 6A–6D and will not be described here.

It is to be understood that the embodiments described above are merely illustrative and that other arrangements can be devised by one of ordinary skill in the art at the time the invention was made without departing from the scope of the invention. For example, although the special signaling was described as a first and second signal, additional signals and/or other signaling mechanisms such as status lines or communication lines being asserted or toggled, or any other conventional and/or unconventional signaling mechanisms could be employed to trigger the application-selection application. Also, smart card in this invention refers to the microcontroller and/or associated devices, and is not limited to a "card" or any particular form factor. Such a device may be embedded in, for example, a standard credit card format, or may be embedded in a ring, watch, automotive component, or any of a variety of various form factors, without departing from the scope of the invention.

What is claimed is:

1. A method of operating a multi-application smart card having at least two independent applications stored thereon, comprising:
    inserting the smart card into a terminal wherein the terminal is incompatible with at least one of the at least two independent applications, wherein the smart card has a persistent storage unit having stored thereon a next application indicator indicating which application to run next time the smart card is inserted into a terminal;
    reading the next application indicator from the persistent storage unit to determine an application to select to be run;
    running the selected application on the smart card;
    if the running of the selected application fails due to being incompatible with the terminal, modifying the next application indicator in the persistent storage unit to indicate a next application to be run; and
    removing the smart card from the terminal.

2. The method of claim 1, wherein modifying includes modifying the next application indicator of the persistent storage unit to indicate an application-selection application as the next application to be run.

3. The method of claim 1, wherein modifying includes modifying the value stored in the persistent storage unit to indicate the present application as the next application to be run.

4. The method of claim 1, wherein modifying includes modifying the value stored in the persistent storage unit to indicate a user-selected application as the next application to be run.

5. The method of claim 1, wherein modifying includes modifying the persistent storage unit to indicate a next application on a predefined list as the next application to be run.

6. The method of claim 1, further comprising running an application-selection program upon receiving a predefined signal from a terminal.

7. The method of claim 1, further comprising determining applications which are available to be run on the smart card.

8. The method of claim 1, further comprising sending a predefined signal to the smart card.

9. A method of selecting an application to be run in a multi-application smart card having thereon at least two applications, comprising:
    inserting a smart card into a terminal that is not compatible with at least one of the at least two applications;
    ensuring that a compatible application is selected from the set of applications stored on the smart card by:
        selecting an application from a set of applications stored on the smart card;
        configuring the smart card to run the selected application upon next insertion; and
        removing the smart card from the terminal until the selected application is an application compatible with the terminal when the application is run on the smart card.

10. The method of claim 9, wherein the selection is executed on an application-selection terminal.

11. The method of claim 9, further comprising sending a predefined signal to the smart card.

12. The method of claim 9, further comprising determining which applications are available to be run on the smart card.

13. A smart card capable of running multiple applications, comprising:
    a persistent storage unit that indicates a next application to be run when the smart card is placed in communication with a terminal that is incompatible with at least one application of the smart card; and
    a microcontroller that, when the smart card is placed in communication with the terminal:
        runs a first application indicated by the value stored in the persistent storage unit as being the next application to be run; and
        modifies the value stored in the persistent storage unit to indicate a second application to be run on the next communication between the smart card and a terminal if the first application fails to execute because it is incompatible with the terminal.

14. The smart card of claim 13, wherein the step of modifying the value stored in the persistent storage unit comprises the microcontroller modifying the value stored in the persistent storage unit to indicate an application-selection program as the next application to be run.

15. The smart card of claim 13, wherein the step of modifying the value stored in the persistent storage unit comprises the microcontroller modifies the value stored in the persistent storage unit to indicate a next application on a predefined list as the next application to be run.

16. The smart card of claim 13, wherein the step of modifying the value stored in the persistent storage unit comprises the microcontroller modifies the value stored in the persistent storage unit to indicate the first application as the next application to be run.

17. The smart card of claim 13, wherein the step of modifying the value stored in the persistent storage unit comprises the microcontroller modifies the value stored in the persistent storage unit to indicate a user-selected application as the next application to be run.

18. The smart card of claim 13, wherein upon receiving one or more predefined signals from a smart card, the microcontroller runs an application-selection program.

19. The smart card of claim 18, wherein the predefined signals includes a first reset followed by a second reset after a predefined interval.

20. A smart card capable of running multiple applications, comprising:
   means for indicating an application to be run next time the smart card is placed in communication with a terminal that is not compatible with at least one application of the smart card;
   means for running the indicated application on the smart card; and
   means for modifying the means for indicating to indicate a next application to be run on an immediately subsequent communication with a terminal if the indicated application fails to execute because it is incompatible with the terminal.

21. The smart card of claim 20, wherein the means for modifying modifies the means for indicating to indicate an application-selection program as the next application to be run.

22. The smart card of claim 20, wherein the means for modifying modifies the means for indicating to indicate a next application on a predefined list as the next application to be run.

23. The smart card of claim 20, wherein the means for modifying modifies the means for indicating to indicate the present application as the next application to be run.

24. The smart card of claim 20, wherein means for modifying modifies the means for indicating to indicate a user-selected application as the next application to be run.

25. The smart card of claim 20, wherein upon receiving a predefined signal from a smart card terminal, the means for running runs an application-selection program.

26. The smart card of claim 25, wherein the predefined signal includes a first reset followed, after a predefined interval, by a second reset.

27. A smart card application selection terminal for use in selecting an application on a multi-application smart card to be run next when the smart card is used with terminals that are not compatible with at least one application of the smart card, comprising:
   a smart card interface that connects the multi-application smart card to the application selection terminal; and
   a manual selection unit for, during a current session, manually selecting an available application stored on the multi-application smart card and that is compatible with a terminal that may not be compatible with other applications on the smart card as a next application to be run on the multi-application smart card in a next session in which the smart card is placed in communication with a terminal that is not compatible with at least one application of the smart card.

28. The terminal of claim 27, further comprising a microcontroller that determines which applications are available to be run on the multi-application smart card.

29. The terminal of claim 27, wherein the microcontroller initiates communication with the multi-application smart card by sending a predefined signal to the smart card.

30. The terminal of claim 27, wherein the microcontroller communicates, to the smart card, the application selected as the next application to be run.

31. A smart card application-selection terminal, comprising:
   means for interfacing with a multi-application smart card; and
   means operable during a current smart card session for manually selecting an available application as a next application to be run on the multi-application smart card in a next session in which the smart card is placed in communication with a terminal that is incompatible with at least one application on the smart card.

32. The terminal of claim 31, further comprising means for initiating communication with the smart card by sending a predefined signal to the smart card.

33. The terminal of claim 31, further comprising means for communicating to the smart card which application was selected as the next application to be run.

34. The terminal of claim 31, further comprising means for determining applications which are available to be run on the multi-application smart card.

35. A smart card system, comprising:
   a multi-application smart card having a persistent storage unit that designates a next application, of a set of applications stored on the multi-application smart card, to be run on the smart card; and
   an application-selection terminal that allows a user, in a current session, to select which application to be run next on the smart card in a next session in which the smart card is placed in communication with a terminal that is incompatible with at least one application on the smart card.

36. The system of claim 35, wherein the smart card modifies the persistent storage unit to designate an application-selection program as the application to be run next.

37. The system of claim 35, wherein the terminal modifies the persistent storage unit to designate a user-selected application as the application to be run next.

* * * * *